United States Patent [19]

Miller et al.

[11] Patent Number: 4,576,709
[45] Date of Patent: Mar. 18, 1986

[54] CATALYTIC UPGRADING OF REDUCED CRUDES AND RESIDUAL OILS WITH A COKE SELECTIVE CATALYST

[75] Inventors: Charles B. Miller; Roy E. Whitt, both of Ashland, Ky.

[73] Assignee: Ashland Oil, Inc., Ashland, Ky.

[21] Appl. No.: 618,635

[22] Filed: Jun. 8, 1984

Related U.S. Application Data

[63] Continuation-in-part of Ser. No. 413,870, Sep. 2, 1982.
[51] Int. Cl.[4] .................. C10G 11/05; C10G 69/04
[52] U.S. Cl. ............................... 208/57; 208/61; 208/89; 208/120
[58] Field of Search .................. 208/57, 61, 89, 120

[56] References Cited

U.S. PATENT DOCUMENTS 3,140,253 7/1964 Plank et al. .................. 208/120
4,299,687 11/1981 Myers et al. .................. 208/113

Primary Examiner—John Doll
Assistant Examiner—O. Chaudhuri
Attorney, Agent, or Firm—Richard C. Willson, Jr.; James L. Wilson

[57] ABSTRACT

The present invention is concerned with upgrading residual oils to gasoline product with a coke selective hydrogen stable faujasite crystalline zeolite catalyst comprising at least 40 weight percent of alumina and rare earth metals in an acidic matrix and effecting regeneration thereof in an oxygen lean atmosphere under CO combustion conditions. A compound of antimony is added to passivate metal contaminants. The regeneration of the catalyst is effected to retain up to 0.25 weight percent carbon and heat balance of the operation is limited as a function of metal promoted CO burn within a dense fluid bed of catalyst being regenerated.

44 Claims, 2 Drawing Figures

CATALYTIC UPGRADING OF REDUCED CRUDES AND RESIDUAL OILS WITH A COKE SELECTIVE CATALYST

This application is a continuation-in-part, of application Ser. No. 413,870, filed Sept. 2, 1982.

BACKGROUND OF THE INVENTION

It is recognized at this stage of the petroleum refining industry that heavy oils such as residual portions of crude oils and reduced crudes boiling above 343° C. (650° F.) comprising Conradson carbon producing components including asphaltenes and porphyrins boiling above about 552° C. (1025° F.) are less than desirable charge stocks in a normal gas oil catalytic cracking operation because the Conradson carbon producing components and metal contaminants rapidly reduce the catalyst cracking activity and selectivity as well as cause undesired yields of dry gas and coke at the expense of desired gasoline boiling range products.

Crude oils comprising metallo-organic compounds are known in which from 30 to 60 percent or more by volume comprise compounds boiling above about 343° C. (650° F.) with from about 10 to 30 volume percent of the total crude volume comprising compounds boiling above about 552° C. or 566° C. (1025° F. or 1050° F.) at atmospheric pressure. Because of the scarcity of high quality gas oils boiling in the range of 343° C. (650° F.) up to about 552° C. (1025° F.), it is now necessary to develop economical and efficient processes for converting residual oils, reduced crudes and more of the crude barrel to desired products of gasoline, gasoline precursors and light fuel oils.

It is also important economically to be able to employ existing processing equipment such as gas oil fluid catalytic cracking processing equipment for converting the less desirable residual oil feed stocks in the absence of major modification and reconstruction of existing equipment. That is, it is particularly desirable to offset the destructive effects of metal contaminants and high Conradson carbon feeds by employing some modified processing parameters rather than effecting major equipment changes. More important is the need to achieve conversion of more of the crude barrel to gasoline and gasoline precursors than obtainable with a more clean gas oil feed as accomplished in existing fluid catalytic cracking (FCC) operations.

Crude oils in the natural state contain a variety of metallo-organic compounds which contribute to undesirable catalyst functions in cracking the heaviest or resid portion of a crude oil. Among these compounds are coke precursors (asphaltenes, poly-nuclear aromatics of at least 5 rings); heavy metals such as iron, nickel, vanadium and copper as free metals, oxides and sulfides or combined as porphyrins in combination with deactivating amounts of sodium, potassium, sulfur and nitrogen materials. Materials such as high boiling asphaltenes tend to break down into coke during the cracking operation which deposits on the catalyst as carbonaceous or hydrocarbonaceous material thereby inactivating the catalyst cracking activity and particularly its selectivity. Metal deposits further contribute to this inactivation of catalyst particles beyond simple restoration techniques and such metals deposition can cause terminal deactivation of a crystalline zeolite structure employed in a cracking catalyst. It has been determined that the heavy metals transfer almost quantitatively from the feed stock to a catalyst particle surface.

Numerous proposals are provided in the prior art for upgrading poor quality residual oil feeds to obtain desired gasoline products. These proposals include the combination of one or more of vacuum distillation solvent extraction, hydrotreating, thermal visbreaking in combination with catalytic cracking and combinations thereof, all of which are criticized as economically unattractive for processing high cost crude oil and particularly that of poor quality.

A number of patents in the prior art disclose the concept of passivating metal contaminants of nickel, vanadium, copper and iron by the addition of metals and compounds thereof selected from the group of magnesium, calcium, strontium, barium, scandium, titanium, chromium, molybdenium, manganese, cobalt, antimony, zinc, cadmium, zirconium, tin, lead and rare earth metals, all of which may or may not contribute to altering product selectivity in a fluid catalytic cracking operation.

It is clear from the above that innovative if not dramatic processing contributions are desperately needed at this stage of the petroleum refining industry. The present invention is directed to a new and novel combination of fluid catalytic cracking processing restrictions and operating parameters which amount to a giant step forward in the catalytic conversion of reduced crudes to gasoline, gasoline precursors and higher boiling liquids and reducing problems associated with the production of gasoline, fuel oils and gasoline precursors from poor quality crudes.

The present invention further addresses itself to obtaining an efficient and economically attractive heat balanced operation for upgrading poor quality crude oils comprising residual portions of crude oils including atmospheric gas oils and higher boiling portions thereof known as vacuum gas oils and vacuum resid boiling above about 552° C. (1025° F.) to produce gasoline and other useful products. The present invention is also directed to a combination of operating parmameters by which the catalyst operating life is retained for an extended on-stream life during conversion of poor quality residual oils comprising components boiling above 552° C. (1025° F.).

SUMMARY OF THE INVENTION

The present invention is concerned with effecting a selective catalytic conversion of crude oils and particularly gas oils comprising the higher boiling portions of crude oils referred to as black oils such as included in topped crudes, residual oils and reduced crudes comprising metal contaminants of nickel, vanadium, iron and copper as well as Conradson carbon producing components boiling above vacuum gas oils and particularly boiling above 552° C. (1025° F.). More particularly, the present invention is concerned with a relationship of operating or processing parameters synergistically compatible with utilizing a special low coke producing cracking catalyst composition under conditions providing selective catalytic cracking of residual oils simultaneously with passivation of metal contaminants, in combination with a controlled catalyst regeneration operation contributing particularly to a heat balanced operation. The particular combination of operating parameters herein identified contribute to providing relatively high yields of light fuel oils, gasoline and gasoline precursor products from poor quality crude oil residual feeds. In yet another aspect the present invention is concerned with a novel approach to maintaining a heat balanced operation in the combination of catalyst regeneration and a selective catalytic cracking of residual oils such as topped and reduced crudes.

DISCUSSION OF SPECIFIC EMBODIMENTS

In a more particular aspect the present invention is concerned with a selective catalytic cracking of residual oils comprising hydrotreated oils boiling below 552° C. (1025° F.) in the presence of a special catalyst composition generally referred to as a low coke producing catalyst and comprising an ammonia exchanged faujasite crystalline aluminosilicate prepared under conditions to produce a stable hydrogen "Y" crystalline zeolite.

CATALYSTS

The low coke producing catalysts employed in the process of this invention are prepared to encompass one or more rare earth metals less than 2 weight percent in the crystalline zeolite or as part of the total catalyst composition comprising in one embodiment within the inorganic oxide comprising matrix material. The inorganic oxide matrix material is preferably an acidic matrix material comprising a siliceous component in combination with clay-type materials providing an abundance of alumina. That is to say, the catalyst composition is prepared to comprise initially at least 40 weight percent of alumina, in combination with from 10 to about 15 weight percent of stable hydrogen form of "Y" faujasite crystalline zeolite dispersed in the inorganic oxide matrix material. Other criteria important to the catalyst physical characteristics is the employment of a preparation technique to provide a high surface area matrix comprising a pore volume of at least 0.3 cc/g. It is preferred that the surface area of the catalyst initially prepared be sufficiently high to provide an equilibrium catalyst surface area greater than 100 sq. m/g.

Catalyst preparation techniques associated with providing the special catalyst compositions utilized in this invention may be derived from the teachings of the following U.S. Patents, the subject matter of which is incorporated herein by reference thereto. The patents include U.S. Pat. Nos. 4,058,484 to Alafandi et al; 4,142,995 to Alafandi et al; 4,237,031 to Alafandi et al; 4,238,360 to Alafandi et al; 4,246,138 to Alafandi et al; 4,310,441 to Alafandi et al; 4,325,845 to Lim et al; and 4,235,847 to Lim et al.

Analysis of some prepared catalyst compositions particularly suitable for use in the processing concepts of this invention are as follows:

TABLE

| Elemental Compositions, Wt. % I.B. | Catalyst A | Catalyst B |
| --- | --- | --- |
| SiO2 | 44.5 | 45.6 |
| Al2O3 | 48.7 | 47.4 |
| TiO2 | 1.27 | 1.67 |
| Fe2O3 | 0.54 | 0.71 |
| Na2O | 0.87 | 0.73 |
| La2O3 | 1.12 | 1.00 |
| CeO2 | 0.43 | 0.31 |
| Nd2O3 (calculated) | 0.45 | 0.36 |
| Pr6O11 (calculated) | 0.15 | 0.13 |
| Re2O3 total | 2.15 | 1.80 |
| La2O3/CeO2 | 2.60 | 3.20 |
| Zeolite Type | "Y" Faujasite | "Y" Faujasite |
| Phase Composition Wt. % I.B. | | |
| XRD % Intern. Std. | 10 | 8 |
| Kaolinite | 61 | 56 |
| Metakaolinite/Mullite Spinel | 23 | 26 |
| Bayerite/Amorp. Al(OH)3 | 5 | 6 |
| Pseudo bochmite | 17 | 11 |
| Anatase (TiO2) | 2 | 2 |

It will be observed from the above analysis that these are high silica-to-alumina ratio catalysts comprising a stable hydrogen form of crystalline faujasite "Y" zeolite is employed comprising rare earths. Less than 20 weight percent of said zeolite is employed in the catalyst. Preferably, not more than about 15 wt% of the special zeolite is included in the catalyst compositions. Therefore, the catalyst compositions contain from about 2 wt% up to an amount that is less than 20 wt% zeolite. Typically, the catalyst of the process of the present invention contains about 2 wt% to about 15 wt% zeolite; and preferably, from about 10 wt% to about 15 wt% zeolite. These catalyst compositions are shown to contain substantial titanium oxide as well as rare earth metals rich in lanthanum to provide a La/Ce ratio of at least 1.92. In addition the catalyst compositions are prepared to provide greater than about 0.4 c.c./g., preferably, greater than about 0.44 c.c./g. pore volume and comprise a pore size distribution greater than 400 Angstroms of at least 35 percent and a pore size distribution greater than 200 Angstroms of at least 50 percent. The zeolite component of the catalyst may be prepared from a mixture of hydrogen stable faujasite zeolite and a rare earth exchanged faujasite zeolite or the rare earth components of the catalyst may be added during catalyst preparation to the hydrogen stable zeolite before or after distribution in an inorganic matrix material comprising the aluminas above identified. Although not particularly identified in the above table, the catalyst compositions are prepared to provide an initial surface area of at least 200 sq. m/g. so that use of the catalyst as herein described will provide a catalyst equilibrium surface area of at least 100 sq. m/g. during accumulation of metal contaminants up to about 8000 ppm Ni+V.

The low coke producing faujasite crystalline zeolite catalyst above identified is prepared in a fluidizable particle size within the range of 20 to 100 microns providing an average particle size in the range of 70 to 80 microns. The catalyst is heated in a regeneration zone to an elevated temperature within the range of about 676° C. (1250° F.) up to about 732° C. (1350° F.) but preferably not above about 727° C. (1340° F.) as hereinafter discussed.

CRACKING

The thus heated catalyst is brought in intimate contact with a residual oil feed containing vacuum resid to be cracked under conditions to form a suspension thereof in a riser cracking zone permitting maintenance of a contact time within the riser less than about 8 seconds, but preferably not more than about 6 seconds and more usually in the range of 2 to 5 seconds before effecting separation of the formed suspension of catalyst and vaporous products of the cracking operation.

GASOLINE ADDITION

A significant contributing aspect of the operating concept of this invention relies upon charging a hydrotreated gas oil of reduced sulfur and nitrogen components with vacuum bottoms to form a residual oil feed which is mixed with a recycled gasoline boiling range liquid product of about 227° C. (440° F.) E.P. and recovered from a cracking operation in an amount to act as a dispersing diluent material with the residual oil feed and provide in substantial measure a liquid heat sink for adjusting the hot recovered regenerated catalyst at a temperature up to about 732° C. or 760° C. (1350° F. or 1400° F.) to a more compatible and desired residual oil cracking temperature producing significant improved yields of gasoline boiling range products. In a particular aspect it is preferred that the mixed feed temperature above obtained and charged to the cracking operation be equal to or less than about 204° C. (400° F.) and that the catalyst to oil ratio be at least about 3 on a weight basis and not more than 15 to obtain desired dispersed catalyst phase oil feed and catalyst particles. Use of a gasoline liquid product of the cracking operation comprising $C_7$ hydrocarbons such as that boiling below about 227° C. (440° F.) on an ASTM basis as above identified is particularly beneficial since it is recovered as a liquid product from the main column overhead at a temperature up to about 66° C. (150° F.) and thus is particularly suitable for charging with the feed as a liquid heat sink. Also, it is observed that within the operating parameters of the invention, the recycled gasoline product does not appear to encounter any significant further catalytic conversion and therefore does not embrace some problems associated with charging water as a diluent and dispersant which is immediately converted to high temperature steam upon contact with the hot catalyst particles and thus requires adequate if not substantial separation equipment in downstream processing equipment.

CRACKING TEMPERATURE

When employing the catalytic cracking concepts and operating parameters herein identified it is intended to apply process restrictions which permit maintaining a vaporous product-catalyst suspension at the riser discharge limited to within the range of about 510° C. (950° F.) to about 566° C. (1050° F.), and preferably not above about 538° C. (1000° F.).

A particularly important aspect of the processing concept of the present invention is concerned with feed preparation at least to the extent that substantial sulfur and nitrogen components are removed from a portion of the residual oil feed in a preliminary hydrotreating operation more often referred to as a desulfurization operation. That is to say, the crude oil feed or residual portion thereof is separated to recover a gas oil phase comprising atmospheric and vacuum gas oils from the resid portion thereof and at least the gas oil phase is desulfurized by hydrotreating over a fixed bed of desulfurization catalyst known in the prior art such as a cobalt molybdenum desulfurization catalyst, a nickel tungsten desulfurization catalyst or any other known desulfurization catalyst in the prior art and suitable for the purpose. The hydrotreating-desulfurization conditions are relatively severe, depending on the nitrogen content of the feed and thus will be effected at a temperature within the range of 343° C. (650° F.) to 427° C. (800° F.) at a pressure within the range of 600 to 700 psig. Hydrogen suitable for the process may be recovered from the products of catalytic reforming and/or in combination with hydrogen from a hydrogen producing plant.

The gas oil boiling range portion of the crude oil thus hydrogenated is then blended or mixed with the resid portion of the crude oil and thereafter the mixture is subjected to the special fluid catalytic cracking operation of this invention as herein provided.

SEPARATION/STRIPPING

Catalyst particles are separated from vaporous hydrocarbon product of catalytic conversion by any one of a number of different techniques known in the prior art. The separated catalyst is passed to a stripping zone for removal of entrained vapors or vaporous material such as by counter-current contact at an elevated temperature up to about 538° C. (1000° F.) with a stripping gas such as steam or other suitable material including carbon dioxide. The stripped catalyst is then passed to a catalyst regeneration operation wherein deposited carbonaceous material sometimes referred to as hydrocarbonaceous material is removed by combustion with an oxygen containing gas such as air or other suitable and appropriate gas comprising oxygen.

REGENERATION

Regeneration of the catalyst particles comprising hydrocarbonaceous deposits of residual oil cracking pursuant to achieving a more heat balanced operation and thus a more economically efficient operation under restricted oxygen deficient oxidizing conditions is accomplished under restricted combustion temperature conditions controlled in substantial measure by the amount of (CO), carbon monoxide combustion effected within a dense fluid bed of the catalyst being regenerated with or without the presence of a carbon monoxide combustion promoter and consistent with retaining some limited residual carbon up to about 0.25 weight percent on regenerated catalyst particles. CO combustion promoters suitable for use in the regeneration operation of this invention may be one or more metals selected from the group consisting of Pt, Pd, Rh, Ru, Ir, Os and Re added in a very small amount generally less than about 10 ppm. The addition of a CO combustion metal promoter causes a dramatic change in the temperature encountered in the dense catalyst bed regeneration operation and control of the thus promoted temperature differential is of particular importance in maintaining the heat balance of the restricted regeneration operation of this invention. Under limited or restricted oxidizing conditions such as an oxygen deficient atmosphere during the catalyst regeneration operation is believed to also alter substantially the state of oxidation of metal contaminants and added metals. More particularly, the regeneration operation of this invention is effected within operating parameters of air feed rate and a CO combustion promoter particularly selected to restrict the combustion temperature encountered to below about 760° C. (1400° F.) or 732° C. (1350° F.), e.g., a temperature within the range of 677° C. (1250° F.) up to about 760° C. (1400° F.), and particularly avoid dispersed catalyst phase after burning of CO. A further restriction desired is to retain sufficient residual carbon on the catalyst particles not to exceed about 0.25 but include at least about 0.1 weight percent thereof. Thus, the selective regeneration technique of the invention by virtue of limited oxygen partial pressure, i.e., an oxygen lean regeneration gas maximized in the area of regenerated catalyst withdrawal and CO combustion restrictions herein identified is considered to be a mild if not a non-oxidizing mode to the extent that at least deposited metal contaminants are substantially retained in a form other than a high state of oxidization so that nickel for example will be in a form more easily passivated and/or deactivated by the addition of antimony and/or other metal combined therewith.

PASSIVATING METALS

A further important aspect of the process combination of this invention relates to the addition of one or more contaminant metal passivating agents of a composition which is readily dispersed with the fluid catalyst particles to provide contact with metal contaminants on the catalyst particles. One or more metals and/or compounds thereof which are readily reducible in the combination operation of this invention and suitable to passivate deposits of nickel, vanadium, iron and copper as well as promote controlled CO combustion may be selected from the group consisting of magnesium, calcium, strontium, barium, aluminum, scandium, titanium, chromium, molybdenum, manganese, cobalt, antimony, zinc, cadmium, tin, lead, rare earth metals, ruthenium, rhodium, palladium, osmium, iridium, platinum, rhenium and mixtures thereof. The catalyst composition of the invention particularly includes a stable form of hydrogen crystalline aluminosilicate or hydrogen "Y" crystalline zeolite dispersed in an acidic inorganic oxide matrix composition of silica and alumina preferably of a high alumina content as discussed above and promoted with a combination of suitable metal components that promote a controlled CO combustion in an oxygen limited atmosphere, e.g., an oxygen lean regeneration gas, and contaminant metals passivation during accumulation thereof on the high surface area, high pore volume catalyst compositions herein identified.

The one or more metal components added as herein provided to passivate metal contaminants and promote CO combustion may be dispersed in substantially any very fine form with the feed or catalyst particles circulated in the system. It is preferred to employ a colloidal compound of antimony or other passivating metal that is more easily finely dispersed with the fluid catalyst particles so that added materials will rapidly form passivated mixtures with deposited metal contaminants comprising V and nickel in the regeneration operation. The metal passivating agent can be added to the catalyst in an amount within the range of 1 to 8 ppm by weight. Conversion of a residual oil hydrocarbon feed with the fluid catalyst particles of this invention is preferably effected in a riser hydrocarbon conversion zone or operation. In yet another aspect, the low coke producing catalyst herein identified and preferred in the cracking process of this invention may also particularly comprise some titanium added during catalyst preparation and/or added during use in the cracking operation. It is theorized that the presence of titanium contributes to the availability of acid cracking sites by the mechanism discussed in U.S. Pat. No. 4,432,890 and co-pending application, Ser. No. 263,395, filed 5/13/81, the subject matter of which is incorporated herein by reference thereto.

It is important in achieving the contributing synergistic operation of this invention to maintain the lower oxide forms of vanadium which melt at a temperature generally above 760° C. (1400° F.). Limiting the oxidizing conditions encountered in the catalyst regeneration operation as herein defined is believed to substantially restrict undesired excess vanadium oxidization so that it is preferentially adsorbed in or with the alumina component of the catalyst matrix rather than deactivating active zeolite cracking sites. It is preferred that the addition of a compound of antimony or other passivating metal be of a relatively low order of magnitude of about 0.1 pound per 1000 ppm of deposited nickel when accumulating nickel up to about 3500 ppm, preferably up to about 2500 ppm when restricting the accumulation of vanadium to not more than 6000 ppm preferably up to about 5000 ppm and when accumulating the combination of nickel plus vanadium up to about 8500 ppm preferably up to about 7500 ppm. It is further preferred that the level of accumulated metals of nickel plus vanadium on the catalyst herein identified be restricted to not more than about 7000 ppm. To maintain a predetermined and desired metals level on the catalyst depending on feed composition, some catalyst will be withdrawn and replaced with a lower metals level catalyst or fresh catalyst of the characteristics herein identified will be added, e.g., in an amount of up to about 2 or 3 pounds per barrel of the feed being cracked. It has been found that by maintaining the equilibrium catalyst surface area above 100 sq. m/g. as above defined in combination with a high alumina content and pore volume, antimony addition and the presence of titanium in the catalyst effectively substantially minimizes, at the regeneration conditions employed, the undesirable effects of nickel and vanadium during the selective cracking operation herein defined. The low coke producing catalyst herein defined can thus be effectively employed to accumulate substantial levels of metal contaminants when converting residual oils and reduced crudes prepared as herein provided to obtain desired light fuel oils and gasoline products in economically attractive yields.

The processing combination herein defined is thus directed to a very special relationship in operating parameters in conjunction with utilizing a special zeolite catalyst herein identified to effect catalytic upgrading of feeds comprising heavy black oils known as residual oils and reduced crudes. The catalytic cracking operation of this invention may be adapted to substantially any fluid catalytic cracking operation with a minimum of effort and little or no apparatus structural changes. Thus, the relationship of operating parameters to maximize catalyst usage employed and processing restrictions imposed synergistically contribute to one another in achieving a desired heat balance operation when upgrading poor quality crudes in combination with suppressing inherit bad-actor components attributed to metal contaminants and Conradson carbon producing components in the resid portion of crude oil.

Figure 1:
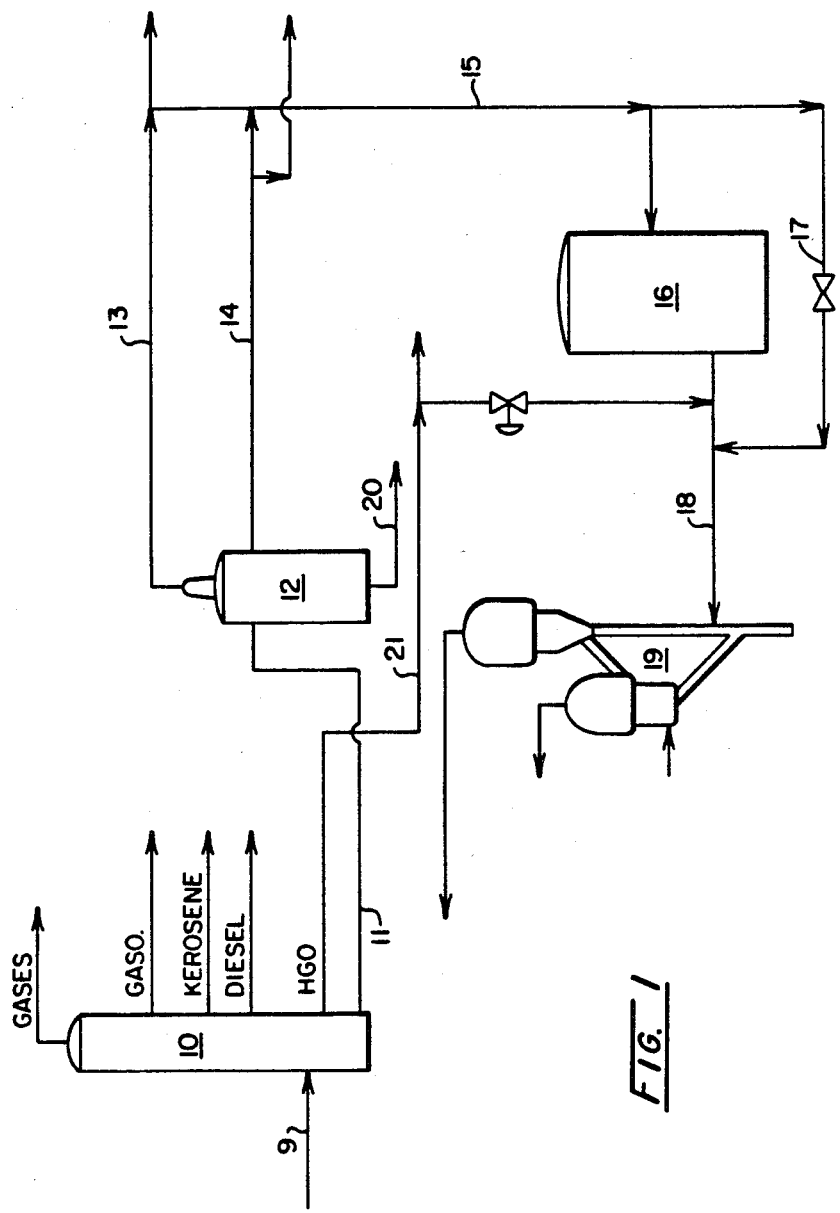
FIG. 1 is a diagrammatic sketch in elevation of a process combination considered conventional comprising a vacuum tower 12, a feed hydrotreater 16 for a gas oil portion of the feed before effecting catalytic cracking thereof.

FIG. II is a diagrammatic sketch in elevation comprising the process steps of FIG. I modified to include passing vacuum resid with hydrogenated gas oil to the fluid catalytic cracking operation. Provision is also made for adding dispersing diluent as well as metals passivating agent material to the hydrogenated feed charged to the fluid catalytic cracking operation.

DISCUSSION OF SPECIFIC EMBODIMENTS

EXAMPLE I (Conventional)

A gas oil boiling in the range of about 260° C. (500° F.) to about 538° C. (1000° F.) is hydrogenated to remove sulfur and nitrogen compounds prior to effecting catalytic cracking thereof with a catalyst composition above defined under condition to provide at the cracking riser reactor outlet a temperature of about 529° C. (985° F.). A product distribution of the following composition is obtained.

| Product | % Yield |
|---|---|
| Gas | 250 SCFB |
| Gasoline | 65 |
| LCO | 17 |
| Slurry | 6 |
| C₃ | 10 |
| C₄ | 10 |
| Coke | 4.68 |
| Liquid Recovery % | 108 |

EXAMPLE II (Conventional Processing with Vacuum Bottoms)

A residual oil feed comprising hydrogenated gas oils of end boiling point of about 537.7° C. (1000° F.) is admixed with 12% of vacuum bottoms boiling above 537.7° C. (1000° F.). The residual oil feed comprises 16,133 bbl/D hydrogenated gas oil mixed with 2200 bbl/D of the vacuum bottoms. The feed is cracked with a catalyst similar to that used in example and under similar reaction conditions. The cracking operation is completed absent metals passivation.

| Product | Units | Ex II Yields | % | Ex I Yields | % | Δ Ex II - Ex I Yield | % Change |
|---|---|---|---|---|---|---|---|
| Gas | MSCFD | 5843 | — | 4083 | — | 1760 | — |
| Gasoline | B/D | 11036 | 60.2 | 10486 | 65.0 | 550 | 20 |
| LCO | B/D | 3843 | 21.0 | 2743 | 17.0 | 1100 | 50 |
| Slurry | B/D | 1293 | 7.1 | 968 | 6.0 | 330 | 15 |
| C₃ | B/D | 1613 | 8.8 | 1613 | 10.0 | 0 | 0 |
| C₄ | B/D | 1613 | 8.8 | 1613 | 10.0 | 0 | 0 |
| Coke | B/D | 345792 | 6.0 | 232547 | 4.68 | 113245 | 14.5 |

EXAMPLE III (Invention-Vac Tower Bottoms, Metal Passivation)

In this example, Example II was repeated with the addition to the feed providing about 3 ppm by weight of antimony. An antimony oxide was employed to passivate metal contaminant deposits on the catalyst. The amount of antimony provided may be selected from within the range of 1 to 8 ppm by weight.

| Product | Units | Example III Yields | % | Example I Yields | % | Yield | % Change | Relative Value |
|---|---|---|---|---|---|---|---|---|
| Gas | MSCFD | 5645 | — | 4083 | — | 1382 | — | 1.0 |
| Gasoline | B/D | 11326 | 61.8 | 10486 | 65.0 | 840 | 38.2 | 1.7 |
| LCO | B/D | 3709 | 20.2 | 2743 | 17.0 | 966 | 43.9 | 1.6 |
| Slurry | B/D | 1201 | 6.5 | 968 | 6.0 | 233 | 10.6 | 1.4 |
| C₃ | B/D | 1613 | 8.8 | 1613 | 10.0 | 0 | 0.0 | 1.1 |
| C₄ | B/D | 1613 | 8.8 | 1613 | 10.0 | 0 | 0.0 | 1.2 |
| Coke | B/D | 339241 | 5.9 | 232547 | 4.68 | 0 | 13.7 | 0.5 |

It wil be observed upon examination of the data of Example II that a delta (Δ) yield change attributable to the vacuum bottoms portion of the feed is considerable even in the absence of passivating metal deposits. That is, there is a yield improvement in gasoline and light cycle oil (LCO) as shown under the heading yield when comparing the yields obtained by Example II and Example I. Even though there is substantially more coke make it is more significant to note that the yield of C₃ and C₄ hydrocarbons was not increased.

The product yield distribution change of Example III is much more dramatic when comparing the results obtained during the addition of an antimony compound to passivate metal contaminant deposits with the results obtained in Example I and/or Example II. That is, the gasoline yield attributed to vacuum bottoms in Example III data comparison is much higher than similarly attributed to Example II. On the other hand and more significant is the observation that the LCO delta yield increase is much less in favor of gasoline production. So also is the yield in slurry oil decreased in this example as well as gas and coke make when compared with the data of Example II.

It is also important to observe and recognize the finding that a relatively low zeolite content catalyst composition of the particular characteristics herein identified can produce such high yields of desired gasoline product from residual portions of crudes treated as herein provided even when achieving substantial metals deactivation levels up to a nickel equivalent metals accumulation level of about 8500 ppm. Thus, a relatively inexpensive catalyst composition because of its restricted zeolite content and composition, is shown to be a most effective residual or black oil conversion catalyst during accumulation of substantial amounts of contaminating metal deposits.

EXAMPLE IV (Conventional Operation)

Referring now to FIG. I, representing a typical commercial operation, there is shown an atmospheric crude tower 10 to which a crude oil feed is introduced by conduit 9. Typically a sweet crude comprising a sulfur content below about 0.6% by weight i.e. Louisiana, Mississippi, Texas sweets and Michigan sweet crudes are charged to the operation. In atmospheric fractionation tower 10 a separation is made permitting the recovery of gaseous material separately from a gasoline boiling range fraction, kerosene, diesel fuel and a heavy atmospheric gas oil (HGO) fraction withdrawn by conduit 21 thereby providing a topped or reduced crude fraction withdrawn from the bottom of the tower by conduit 11 and comprising an initial boiling point (IPB)

of at least 343° C. (650° F.) or higher depending on crude composition and product slate desired. The reduced crude fraction withdrawn by conduit 11 is then passed to a vacuum distillation tower 12 maintained at a sufficiently reduced pressure of about 30 mm Hg vacuum at a temperature of about 388° C. (730° F.) to permit separation and recovery of a light vacuum gas oil withdrawn by conduit 13 and a heavier vacuum gas oil withdrawn by conduit 14 often referred to as a bulk distillate. In this arrangement, a vacuum resid is recovered from the bottom of vacuum tower 12 for disposal as by blending to produce No. 6 fuel oil. The vacuum gas oils in conduit 13 and 14 are combined and passed by conduit 15 all or in part to a hydrogenation or hydrotreater zone 16. Portions of vacuum gas oil in conduits 13 and 14 may be sent to other refinery units depending on products desired or themselves utilized as products where appropriately expedient. The hydrotreater 16 is operated under conditions which provide hydrogen uptake sufficient to substantially saturate most olefins contained in the vacuum gas oils charged thereto. The operating conditions of temperature and pressure are preferably selected to minimize significant cracking of ring compounds comprised in the oil feed. In a typical operation, about 80% of the vacuum gas oils in conduit 15 are sent to the hydrotreater with about 20% by weight thereof being passed by bypass conduit 17 for admixture with hydrogenated gas oil products before being charged to catalytic cracking in a riser cracking zone 19. In addition to the above, the atmosperic gas oil in conduit 21 is admixed with hydrogenated vacuum gas oil or separately charged to the riser cracking zone 19 of a typical fluid catalytic cracking process circulating a zeolite cracking catalyst through the riser cracking zone and an adjacent regeneration zone maintained under operating conditions providing high yields of gasoline boiling range products. The product yield and selectivity of example 1 is typical of that obtainable by the above identified operation.

EXAMPLE V (Invention)

Figure 2:
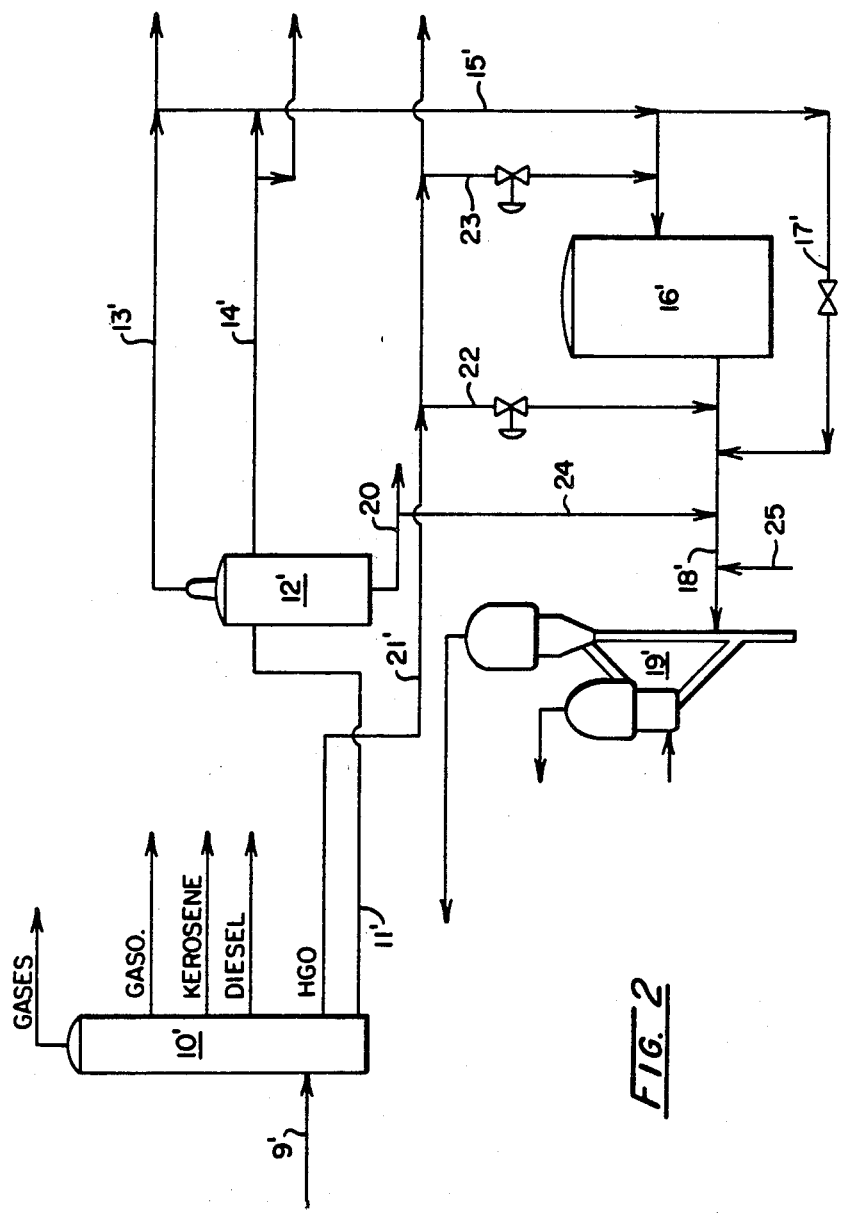

In the processing arrangement of FIG. 2 and representation of the improved combination operation of the present invention, the processing sequence is similar to the conventional process above with respect to FIG. 1 except for the following variations. That is, in the improved process arrangement of FIG. 2, the vacuum resid recovered from vacuum distillation zone 12 and recovered by 20' is passed by conduit 24 for admixture with the hydrogenated vacuum gas oil recovered from zone 16 before being charged to the riser cracking zone 19. It is contemplated, in one embodiment, charging the vacuum resid on conduit 24 separately to the riser cracking zone 19 such as to a downstream portion thereof. On the other hand, the heavy atmospheric gas oil fraction recovered by conduit 21 may be passed all or in part by conduit 22 to conduit 18' and thence to the riser cracking zone 19. In another aspect a portion of this gas oil feed on conduit 21 may be passed by conduit 23 for charging to the hydrotreater with the vacuum gas oils in conduit 15. In a more particular aspect, the process combination of FIG. 2 is particularly implemented when using the special low zeolite content cracking catalyst above discussed in combination with effecting metals passivation with the special treating agent herein discussed. Thus there is a significant synergistic contribution attributable to the above combination of operating parameters which reduces substantially the thermal output of a fluid catalytic cracking operation to the extent permitting the addition of up to 17% of vacuum tower bottoms or resid with the gas oil feed charged to fluid cracking by conduit 18. Based on 18,600 barrels per day of feed charged to the FCC permits the addition of 2700 barrels per day of vacuum resid when manufacturing products disclosed above in example III.

Having thus generally described the improved cracking process of the present invention and the particular catalyst compositions used therein with advantage and more particularly described specific examples in support thereof, it is to be understood that no undue restrictions are to be imposed by reasons thereof except as defined by the following claims.

What is claimed is:

1. In a process for catalytically converting residual oils comprising metallo-organic compounds boiling above 552° C. (1025° F.) with an active zeolite cracking catalyst comprising a passivating metal added to passivate nickel accumulated on catalyst particles comprising carbonaceous deposits and where the catalyst is regenerated with an oxygen containing gas to produce a CO rich flue gas, the improvement which comprises:
 (a) partially hydrogenating a gas oil product of distillation before admixture with a vacuum resid product to provide a hydrogenated gas oil and mixing said hydrogenated gas oil with said vacuum resid product to form a vacuum resid-hydrogenated gas oil mixture;
 (b) catalytically cracking the vacuum resid-hydrogenated gas oil mixture with a special catalyst comprising a hydrogen form of faujasite crystalline zeolite comprising rare earths dispersed in a high alumina content acidic matrix material providing cracking activity whereby carbonaceous material is deposited on the catalyst;
 (c) regenerating said catalyst by combustion to remove deposited carbonaceous material to a desired residual coke level in the presence of an oxygen lean regeneration gas under a regeneration temperature restricted to within the range of 677° C. (1250° F.) up to about 760° C. (1400° F.);
 (d) limiting said regeneration temperature as recited hereinabove and promoting CO burning with oxygen lean gas within a dense fluid bed of catalyst being regenerated;
 (e) said catalyst being further restricted to comprise: (1) less than 20 weight percent of said faujasite crystalline zeolite comprising rare earths, (2) said zeolite mixture being dispersed in an acidic siliceous inorganic oxide matrix comprising at least 40 weight percent alumina, (3) said catalyst being prepared under conditions to provide catalyst particles with a surface area greater than 200 sq. m./g. and a pore volume of at least 0.4 c.c./g., and (4) said catalyst comprising rare earth metals also distributed in the catalyst matrix in an amount providing a lanthanum to cerium ratio greater than one.

2. The method of claim 1 wherein the catalyst accumulates metal contaminants during use and a compound of antimony is added to the catalyst after a substantial accumulation of metal contaminants thereon, said accumulation comprising nickel in an amount of up to about 2500 ppm of nickel.

3. The method of claim 1 wherein nickel and vanadium deposit on the catalyst during conversion of the residual oil feed mixture and the catalyst is regenerated in an oxygen lean atmosphere in the presence of one or more metal compounds which reduce the gas and coke forming properties of nickel accumulated on the catalyst.

4. The method of claim 1 wherein temperature restricted regeneration of the catalyst is accomplished in the presence of a CO combustion promoter under conditions to retain residual carbon up to about 0.25 wt.% on the catalyst in the presence of an oxygen lean atmosphere restricting the oxidation of deposited nickel and vanadium metal contaminants on the catalyst.

5. The method of claim 1 wherein the stable faujasite crystalline zeolite containing catalyst is prepared with the addition of less than 2 weight percent of rare earth metals rich in lanthanum.

6. The method of claim 1 wherein a controlled CO combustion is effected during catalyst regeneration in the presence of one or more platinum group metal CO combustion promoters.

7. The method of claim 1 wherein the equilibrium surface area of the catalyst is maintained at a level of at least 100 sq.m./g. by the addition of a compound of antimony and by employing a contaminated catalyst replacement rate with fresh catalyst particles up to about 2 or 3 pounds per barrel of the feed being cracked by the catalyst.

8. A method for catalytically cracking a residual oil comprising vacuum bottoms with metallo-organic compounds, which method comprises:
(a) passing through a riser hydrocarbon cracking zone an oil feed comprising a hydrogenated and desulfurized vacuum gas oil mixed with higher boiling vacuum bottoms and atmospheric gas oil in contact with a low coke producing crystalline faujasite zeolite catalyst comprising lanthanum-rich rare earth metals and an acidic siliceous matrix containing alumina in an amount of at least 40 wt%, based on the weight of the catalyst, to produce a vaporous product, resulting in a suspension of said catalyst in said vaporous product, said contact of said oil feed with said catalyst being effected in the presence of a dispersant material comprising added liquid gasoline boiling range product of cracking and a nickel passivating metal compound at cracking temperatures restricted to limit the temperature of said suspension of said catalyst in said vaporous product at the riser discharge to within the rage of 510° C. (950° F.) up to about 566° C. (1050° F.), separating and recovering catalyst particles containing deposited carbonaceous material from vaporous hydrocarbon conversion products;
(b) regenerating recovered catalyst particles by combustion of said deposited carbonaceous material to remove deposited carbonaceous material to a desired residual coke level, limiting catalyst temperature during said combustion of deposited carbonaceous material by employing an oxygen lean atmosphere under conditions retaining up to about 0.25 weight percent residual coke on the catalyst; and
(c) restraining the effects of deposited metal contaminants of vanadium and nickel below about 7500 ppm on the product selectivity of cracking by employing a catalyst replacement rate sufficient to maintain an equilibrium catalyst surface area of at least 100 sq. m./g., whereby the yields of coke and dry gas are substantially reduced in said cracking and the production of gasoline and light cycle oil are increased.

9. The method of claim 8, wherein combustion of formed CO during catalyst regeneration is substantially confined within a dense fluid bed of the catalyst being regenerated and heat balance of said combination method is maintained in substantial measure by using a low coke forming catalyst, by the amount of CO combustion effected in an oxygen lean atmosphere within the dense fluid bed of catalyst, and by the combination of processing a hydrogenated vacuum gas oil admixed with a vacuum resid and an atmospheric gas oil charged to a riser cracking zone providing a product vapor outlet temperature within the range of 510° C. (950° F.) up to about 538° C. (1000° F.).

10. The method of claim 8 wherein the low coke producing catalyst comprises less than 15 weight percent of a stable ammonia exchanged faujasite crystalline zeolite comprising rare earths dispersed in an acidic inorganic oxide matrix providing a surface area for equilibrium catalyst particles used in the cracking operation of at least 100 sq. m/g. during the accumulation of Ni and V metal deposits up to about 7500 ppm Ni+V.

11. A method for selectively catalytically converting high boiling residual oil components of relatively low and higher API gravity comprising metallo-organic compounds contributing carbonaceous and metal deposits during catalytic cracking, which method comprises:
(a) contacting in a riser cracking zone an oil feedstock comprising a hydrogenated vacuum gas oil portion of said residual oil admixed with atmospheric gas oil and a liquid gasoline product of catalytic cracking boiling below 227° C. (440° F.) with a coke selective fluid cracking catalyst comprising 2 weight percent to 15 weight percent crystalline zeolite dispersed in a silica-clay matrix providing at least 40 weight percent alumina to produce a vaporous product and to form a suspension of said catalyst in said vaporous product, said contacting being carried out at a temperature which will limit the temperature of said suspension of said catalyst in said vaporous product at the riser discharge to within the range of about 510° C. (950° F.) to about 566° C. (1050° F.) for a time within the range of 2 seconds to 5 seconds to produce substantial yields of gasoline and light cycle oil products, said catalyst comprising a mixture of rare earth exchanged faujasite crystalline zeolite of high lanthanum content and ammonium-exchanged faujasite crystalline zeolite in said silica-clay matrix also provided with rare earth metals, said catalyst provided with one or more metal components which passivate deposited metals contaminants and promote carbon monoxide combustion;
(b) recovering gasoline and light cycle oil products of said cracking, regenerating the coke selective catalyst under conditions to retain some residual carbon on the regenerated catalyst; and
(c) maintaining deposited nickel and vanadium contaminants on said catalyst in a concentration and state which substantially reduce the deactivating effects thereof attributed to promoting the yields of gas, coke and catalyst particle agglomeration.

12. The method of claim 11 wherein the catalyst comprises titanium.

13. The method of claim 11 wherein catalyst particles comprising metal contaminants are replaced with fresh catalyst particles at a rate less than 1 pound per barrel of residual oil feed.

14. A method for sustaining the active life of a zeolite catalyst employed in the catalytic cracking of high API gravity residual oil fractions comprising metal contaminants in a resid portion thereof, which method comprises:
   (a) providing as the catalyst a "Y" faujasite crystalline zeolite comprising hydrogen and rare earth exchanged forms thereof dispersed in a high surface area siliceous matrix comprising at least 40 weight percent alumina;
   (b) effecting catalytic cracking of said residual oil feed comprising a hydrogenated vacuum gas oil admixed with up to 17% of vacuum tower bottoms and liquid gasoline boiling product of said cracking under conditions of conversion sufficient to form additional yields of gasoline boiling product and light cycle oils;
   (c) effecting said cracking in the presence of added antimony pentoxide when deposited nickel achieves a level of about 2500 ppm on the equilibrium catalyst of said cracking; and
   (d) maintaining said catalyst at a temperature not exceeding about 732° C. (1350° F.) during vanadium accumulation on the catalyst in an amount of up to 5000 ppm.

15. A method for catalytically upgrading a residual portion of crude oil comprising less than 17 weight percent of metallo-organic compounds, which method comprises:
   (a) desulfurizing and hydrogenating a separated vacuum gas oil boiling range portion of residual oil to provide a hydrogenated gas oil, mixing said hydrogenated gas oil with a vacuum resid portion of said crude oil and an atmospheric gas oil portion to form an oil feed mixture, catalytically cracking said oil feed mixture under elevated temperature hydrocarbon conversion conditions selected to particularly optimize the yield of gasoline and light cycle oil boiling range products during limited dispersed phase contact in a riser contact zone with a catalyst composition comprising a catalytically-active ammonia exchanged crystalline faujasite zeolite comprising rare earths, said zeolite being dispersed in an amount in the range of 2 to 15 weight percent in a catalytically active acidic siliceous matrix comprising rare earths and at least 40 weight percent alumina, said catalyst composition comprising at least 100 sq. m./g. surface area, a pore volume of at least 0.4 cc/g and providing a pore size distribution wherein greater than 35% of the pore volume is made up of pores having diameters of at least 400 Angstroms;
   (b) restricting the accumulation of nickel and vanadium on said catalyst composition not to exceed about 7500 ppm and not more than 2500 ppm nickel before addition of an antimony compound thereto; and
   (c) recovering gasoline and light cycle oil products of said cracking in improved yield.

16. A method for upgrading crude oil in a combination process, which method comprises:
   (a) distilling a crude oil under atmospheric conditions to achieve separate recovery of gaseous material, gasoline, diesel oil, a heavy atmospheric gas oil fraction, and a residual bottom portion of said crude oil,
   (b) separating said residual bottom portion of said crude oil by vacuum distillation into vacuum gas oils and a vacuum resid,
   (c) hydrotreating said vacuum gas oils to provide hydrotreated vacuum gas oils,
   (d) mixing said vacuum resid in an amount up to 12 wt.% with said hydrotreated vacuum gas oils and said recovered atmospheric gas oil to form a feed mixture,
   (e) catalytically cracking said feed mixture with a cracking catalyst comprising a catalytically active stable hydrogen form of crystalline faujasite "Y" zeolite in an amount within the range of 2 wt% to 15 wt% distributed in a siliceous inorganic oxide matrix comprising at least 40 wt% alumina dispersed with rare earth metals rich in lanthanum to form a high surface area composition providing a pore volume of at least about 0.4 c.c./g. and substantial pore size openings of at least 400 Angstroms, and
   (f) recovering a gasoline product of said cracking operation.

17. The method of claim 16 wherein the catalyst employed in said cracking operation is regenerated to remove hydrocarbonaceous deposits by combustion in an oxygen lean atmosphere retaining up to 0.25 wt% carbon on the regenerated catalyst and combustion of formed carbon monoxide to carbon dioxide is promoted with a Group VIII metal component.

18. The method of claim 16 wherein a metal passivating agent within the range of 1 to 8 ppm by weight is added to the catalyst to passivate deposited nickel.

19. The method of claim 17, wherein a metal passivating agent is added to said catalyst and the amount of said metal passivating agent used is selected from within the range of 1 to 8 ppm by weight.

20. The method of claim 19, wherein the metal passivating agent added to the catalyst comprises antimony pentoxide.

21. A method for cracking a gas oil portion of a crude oil, said gas oil portion boiling in the range of 260° C. (500° F.) to 538° C. (1000° F.), which method comprises:
   (a) separating said crude oil to separately recover atmospheric gas oil, vacuum gas oil, and a vacuum resid,
   (b) hydrotreating said vacuum gas oil to remove sulfur and nitrogen therefrom and to provide hydrotreated vacuum gas oil,
   (c) mixing atmospheric gas oil with hydrotreated vacuum gas oil and vacuum resid and with sufficient liquid gasoline product of the process to reduce the viscosity of the vacuum resid and heavy gas oil components and to form a feed mixture,
   (d) contacting said feed mixture comprising recycled gasoline with a catalyst comprising from 10 wt% to about 15 wt% stable hydrogen form of crystalline faujasite "Y" zeolite dispersed in a high alumina content siliceous matrix to form a hydrocarbon conversion product thereof at a temperature within the range of 510° C. (950° F.) to 566° C. (1050° F.),
   (e) separating said hydrocarbon conversion product from catalyst particles and stripping the catalyst at an elevated temperature to separate entrained vaporous material from the catalyst particles, (f) regenerating the stripped catalyst in a regeneration zone in an oxygen restricted atmosphere under conditions selected to restrict the regeneration temperature from exceeding about 760° C. (1400° F.) and provide regenerated catalyst particles comprising less than about 0.25 weight percent coke, and (g) recycling regenerated catalyst to said hydrocarbon converson step (d) above recited.

22. The method of claim 21, wherein the regenerating of step (f) is carried out in the presence of a CO combustion promoter.

23. In a process for catalytically converting residual oils comprising metallo-organic compounds boiling above 552° C. (1025° F.) with an active zeolite cracking catalyst comprising a passivating metal added to passivate nickel accumulated on catalyst particles comprising carbonaceous deposits, and where the catalyst is regenerated with an oxygen containing gas to produce a CO rich flue gas, the improvement which comprises:

(a) partially hydrogenating a gas oil product of distillation to provide a hydrogenated gas oil before admixture with a vacuum resid portion to form a vacuum resid-hydrogenated gas oil mixture;

(b) catalytically cracking said vacuum resid-hydrogenated gas oil mixture with a special catalyst comprising a hydrogen form of "Y" faujasite crystalline zeolite comprising rare earths, said zeolite being dispersed in a high-alumina acidic matrix material providing cracking activity, whereby carbonaceous material is deposited on said catalyst to form a coked catalyst;

(c) regenerating said coked catalyst by combustion to remove the deposited carbonaceous material to a desired residual coke level in the presence of an oxygen limited atmosphere under a regeneration temperature restricted to within the range of 677° C. (1250° F.) up to about 732° C. (1350° F.) and promoting CO burning with an oxygen limited atmosphere within a dense fluid bed of catalyst being regenerated;

(d) said special catalyst being further restricted to comprise:

(1) up to 15 wt% of said hydrogen form of "Y" faujasite crystalline zeolite comprising rare earths, (2) said zeolite being dispersed in an acidic siliceous inorganic matrix comprising at least 40 wt% alumina, (3) said catalyst prepared under conditions to provide catalyst particles with a surface area of at least 200 sq. m./g. and a pore volume of at least 0.44 c.c./g., and (4) said catalyst comprising rare earth metals also distributed in the catalyst matrix in an amount providing a lanthanum to cerium ratio of at least 1.92.

24. The method of claim 23, wherein said catalyst accumulates metal contaminants during use and a compound of antimony is added to the catalyst after a substantial accumulation of up to about 3500 ppm of nickel.

25. The method of claim 23 wherein nickel and vanadium deposit on said catalyst during conversion of said residual oils and said coked catalyst is regenerated in an oxygen limited atmosphere in the presence of one or more metal compounds which reduce the gas and coke forming properties of nickel accumulated on the catalyst.

26. The method of claim 23, wherein temperature restricted regeneration of said coked catalyst is accomplished in the presence of a CO combustion promoter under conditions to retain residual carbon up to about 0.25 weight percent on said catalyst in the presence of an oxygen limited atmosphere restricting the oxidation of deposited nickel and vanadium metal contaminants on said catalyst.

27. The method of claim 23, wherein the faujasite crystalline zeolite-containing catalyst comprising rare earth metals is prepared with the addition of less than 2 weight percent rare earth metals rich in lanthanum.

28. The method of claim 23, wherein a controlled CO combustion is effected during catalyst regeneration in the presence of one or more platinum group metal CO-combustion promoters.

29. The method of claim 23, wherein the surface area of the equilibrium catalyst is maintained at a value that is at least 100 sq. m./g. by the addition of a compound of antimony and by replacing contaminated catalyst with fresh catalyst.

30. A method for catalytically cracking a residual oil comprising vacuum bottoms containing metallo-organic compounds, which method comprises:

(a) contacting a hydrogenated and desulfurized vacuum gas oil mixed with higher-boiling vacuum bottoms and atmospheric gas oil with a low-coke producing catalyst in a riser cracking zone to produce a mixture of coked catalyst and vaporous hydrocarbon conversion products, said contacting being carried out at cracking temperatures that will limit the temperature of said mixture of coked catalyst and vaporous hydrocarbon conversion products at the riser cracking zone discharge to within the range of about 510° C. (950° F.) to about 566° C. (1050° F.), said catalyst comprising a stable hydrogen form "Y" crystalline faujasite zeolite comprising lanthanum-rich rare-earth metals providing a lanthanum/cerium ratio of at least 1.92 dispersed in a siliceous matrix comprising at least 40 wt% alumina, said contacting being effected in the presence of a dispersant material comprising added liquid gasoline boiling range product of cracking and a nickel passivating metal compound, discharging a mixture of coked catalyst and vaporous hydrocarbon conversion products from the outlet of said riser cracking zone, separating said coked catalyst from said vaporous hydrocarbon conversion products, passing said coked catalyst into and through a stripping zone to provide a stripped catalyst;

(b) regenerating said stripped catalyst by combustion of the carbonaceous deposits on said stripped catalyst, limiting the temperature of the catalyst during said combustion of the carbonaceous deposits by employing an oxygen limited atmosphere under conditions whereby up to about 0.25 weight percent residual coke is retained on the catalyst; and (c) restraining the effects of deposited metal contaminants of vanadium and nickel below about 8500 ppm on the product selectivity of cracking by employing a catalyst replacement rate sufficient to maintain an equilibrium catalyst surface area of at least 100 sq. m./g., whereby the yields of coke and dry gas are substantially reduced in said cracking method and the production of gasoline and light cycle oils are increased.

31. The method of claim 30, wherein combustion of formed CO during catalyst regeneration is substantially confined within a dense fluid bed of the catalyst being regenerated and heat balance of said method is maintained in substantial measure by using said low coke producing catalyst, by the amount of CO combustion effected in an oxygen limited atmosphere within the dense fluid bed of catalyst, and by the combination of processing a hydrogenated vacuum gas oil admixed with a vacuum resid and an atmospheric gas oil charged to a riser cracking zone providing a product vapor outlet temperature within the range of 510° C. (950° F.) up to about 538° C. (1000° F.).

32. The method of claim 30, wherein the low coke producing catalyst comprises less than 15 wt% of said stable hydrogen form of crystalline "Y" faujasite zeolite dispersed in said matrix providing a surface area for equilibrium catalyst particles used in said cracking method of at least 100 sq. m./g. during the accumulation of nickel and vanadium metal deposits up to about 8500 ppm nickel and vanadium.

33. A method for selectively catalytically converting high boiling residual oil comprising metallo-organic compounds contributing carbonaceous and metal deposits during catalytic cracking, which method comprises:
   (a) contacting in a riser cracking zone a hydrogenated vacuum gas oil portion of said residual oil admixed with atmospheric gas oil and a liquid gasoline product of catalytic cracking boiling below 227° C. (440° F.) with a coke selective fluid cracking catalyst comprising 2 wt% to 15 wt% crystalline zeolite dispersed in a silica-clay matrix containing at least 40 wt% alumina to produce a vaporous product and to form a suspension of said catalyst in said vaporous product, said contacting being carried out at a temperature which will limit the temperature of said suspension at the riser outlet to within the range of about 510° C. (950° F.) to about 566° C. (1050° F.) for a sufficient time to produce substantial yields of gasoline and light cycle oil products, said catalyst comprising a mixture of rare earth metal-exchanged "Y" faujasite crystalline zeolite of high lanthanum content and ammonium-exchanged "Y" faujasite crystalline zeolite in said silica-clay matrix also provided with rare earth metals, said catalyst provided with one or more metal components which passivate deposited metals contaminants on said catalyst and promote carbon monoxide combustion;
   (b) recovering gasoline and light cycle oil products of said cracking method, regenerating the coke selective catalyst under conditions for retaining some residual carbon on the regenerated catalyst; and
   (c) maintaining deposited nickel and vanadium contaminants on said catalyst in a concentration and state which substantially reduce the deactivating effects thereof attributed to promoting the yields of gas, coke and catalyst particle agglomeration.

34. The method of claim 33, wherein said catalyst comprises titanium.

35. The method of claim 33, wherein catalyst particles comprising metal contaminants are replaced with fresh catalyst particles so as to maintain the surface area of equilibrium catalyst at a value of at least 100 sq. m./g.

36. A method for sustaining the active life of a zeolite catalyst employed in the catalytic cracking of high API gravity residual oil feed comprising metal contaminants, which method comprises:
   (a) effecting catalytic cracking of said residual oil feed comprising a hydrogenated vacuum gas oil admixed with up to 17% of vacuum tower bottoms and liquid gasoline boiling product of said cracking under conditions of conversion sufficient to form additional yields of gasoline boiling product and light cycle oils, said catalytic cracking being carried out in a riser cracking zone in the presence of a catalyst comprising a mixture of hydrogen form "Y" faujasite crystalline zeolite dispersed in a high-surface area siliceous matrix comprising alumina, said alumina being present in an amount of at least 40 wt% alumina, based on the weight of said catalyst, to provide a coked catalyst and hydrocarbon conversion products, separating said hydrocarbon conversion products from said coked catalyst, regenerating said coked catalyst in a regeneration zone in an oxygen limited atmosphere to provide a regenerated catalyst, recycling said regenerated catalyst to said riser cracking zone;
   (b) effecting said cracking in the presence of added antimony pentoxide when the combination of deposited nickel and vanadium achieves a level of about 8500 ppm on the equilibrium catalyst of said cracking; and
   (c) maintaining the equilibrium catalyst recovered from said regeneration zone at a temperature of up to about 732° C. (1350° F.).

37. A method for catalytically upgrading a residual portion of crude oil comprising less than 17 weight percent of metallo-organic compounds, which method comprises:
   (a) desulfurizing and hydrogenating a separated vacuum gas oil boiling range portion of said crude oil to provide a hydrogenated vacuum gas oil, mixing said hydrogenated vacuum gas oil with a vacuum resid portion of said crude oil and an atmospheric gas oil portion to form an oil feed mixture, catalytically cracking said oil feed mixture under elevated temperature hydrocarbon conversion conditions selected to particularly optimize the yield of gasoline and light cycle oil boiling range products during limited dispersed phase contact in a riser contact zone with a catalyst comprising a catalytically-active ammonia-exchanged crystalline "Y" faujasite zeolite comprising a first group of rare earth metals dispersed in an acidic siliceous matrix comprising a second group of rare earth metals and at least 40 wt% alumina, said zeolite being present in an amount within the range of 2 wt% to 15 wt% based on the weight of the catalyst, said catalyst providing an initial surface area of at least 200 sq. m./g., a pore volume that is greater than 0.44 c.c./g., and a pore size distribution wherein greater than 35% of the total pore volume is made up of pores having diameters that are at least 400 Angstroms;
   (b) restricting the accumulation of nickel and vanadium on said catalyst to a maximum amount of about 8500 ppm and the accumulation of nickel to a maximum amount of about 3500 ppm nickel before addition of an antimony compound thereto; and
   (c) recovering gasoline and light cycle oil products of said cracking in improved yields.

38. A method for upgrading crude oil in a combination process, which method comprises:
   (a) distilling a crude oil under atmospheric conditions to achieve separate recovery of gaseous material, gasoline, diesel oil, a heavy atmospheric gas oil fraction, and a residual bottom portion of said crude oil;

(b) separating said residual bottom portion by vacuum distillation into vacuum gas oil and a vacuum resid;

(c) hydrotreating said vacuum gas oil to provide hydrotreated vacuum gas oil, mixing said vacuum resid in an amount up to 12 wt% with said hydrotreated vacuum gas oil and said atmospheric gas oil fraction to form a feed mixture;

(d) catalytically cracking said feed mixture with a cracking catalyst comprising 2 wt% to 15 wt% catalytically-active crystalline "Y" faujasite zeolite distributed in a siliceous inorganic oxide matrix comprising at least 40 wt% alumina and having dispersed therein rare earth metals rich in lanthanum to form a high surface area composition providing a pore volume of at least about 0.44 cc/g and greater than 35% of the total pore volume in pores having pore size openings of at least 400 Angstroms; and (e) recovering a gasoline product of said cracking.

39. The method of claim 39, wherein said catalyst is regenerated to remove hydrocarbonaceous deposits by combustion in an oxygen limited atmosphere to retain up to 0.25 wt% carbon on the regenerated catalyst and combustion of formed carbon monoxide to carbon dioxide is promoted with a Group VIII metal component.

40. The method of claim 38, wherein a metal passivating agent is added to said catalyst in an amount of about 0.1 pound per 1000 ppm of deposited nickel when accumulating up to about 3500 ppm nickel, when restricting the accumulation of vanadium up to about 6000 ppm vanadium, and when accumulating the combination of nickel and vanadium up to about 8500 ppm.

41. The method of claim 39, wherein a metal passivating agent is added to said catalyst in an amount of about 0.1 pound per 1000 ppm of deposited nickel when accumulating up to about 3500 ppm nickel, when restricting the accumulation of vanadium up to about 6000 ppm vanadium, and when accumulating the combination of nickel and vanadium up to about 8500 ppm.

42. The process of claim 40, wherein the metal passivating agent added to said catalyst comprises antimony pentoxide.

43. A method for upgrading a crude oil, which method comprises:

(a) separating said crude oil to separately recover atmospheric gas oil, vacuum gas oil, and a vacuum resid;

(b) hydrotreating said vacuum gas oil to remove sulfur and nitrogen therefrom and provide hydrotreated vacuum gas oil;

(c) mixing said atmospheric gas oil with said hydrotreated vacuum gas oil and said vacuum resid with sufficient liquid gasoline product of the process to reduce the viscosity of the vacuum resid and heavier gas oil components and form a feed mixture;

(d) contacting said feed mixture in a riser cracking zone with a special catalyst comprising 10 wt% to about 15 wt% crystalline "Y" faujasite zeolite dispersed in a high alumina content siliceous matrix to form a mixture of a hydrocarbon conversion product and said catalyst, the temperature in said riser cracking zone being one that will enable said mixture of a hydrocarbon conversion product and said catalyst at the outlet of said riser cracking zone to be maintained at a temperature within the range of about 510° C. (950° F.) to about 566° C. (1050° F.);

(e) separating said hydrocarbon conversion product from said catalyst and stripping the catalyst at an elevated temperature to separate entrained vaporous material from the catalyst and provide a stripped catalyst;

(f) regenerating said stripped catalyst in a regeneration zone in an oxygen limited atmosphere under conditions selected to restrict the regeneration temperature to a maximum temperature of about 760° C. (1400° F.) and provide regenerated catalyst having a residual coke level within the range of about 0.1 wt% to about 0.25 wt%; and (g) recycling said regenerated catalyst to said riser cracking zone.

44. The process of claim 43, wherein said regenerating is carried out in the presence of a CO combustion promoter.

* * * * *